United States Patent [19]
Trell

[11] 3,947,641
[45] Mar. 30, 1976

[54] USE OF PUBLIC SUBSCRIBER TELEPHONE NETWORK; METHOD AND APPARATUS

[76] Inventor: Anders Edvard Trell, Polhemsgatan 20 B4, 11236 Stockholm, Sweden

[22] Filed: June 3, 1974

[21] Appl. No.: 475,646

[30] Foreign Application Priority Data
June 7, 1973 Sweden.............................. 7308086

[52] U.S. Cl..................... 179/2 A; 179/1 H; 179/39
[51] Int. Cl.².................................... H04M 11/08
[58] Field of Search........... 179/2 A, 1 H, 2 TV, 39, 179/18 DA, 90 AD

[56] References Cited
UNITED STATES PATENTS

| | | | |
|---|---|---|---|
| 3,322,904 | 5/1967 | McCay et al................... | 179/90 AD |
| 3,484,561 | 12/1969 | Matthews........................... | 179/2 A |
| 3,557,318 | 1/1971 | Buonsante et al.................. | 179/2 A |
| 3,727,007 | 4/1973 | Catlin............................. | 179/18 DA |
| 3,784,757 | 1/1974 | Woolf et al. .................... | 179/18 DA |
| 3,798,381 | 3/1974 | Piacente et al. ................ | 179/18 DA |
| 3,816,662 | 6/1974 | Shaver et al........................ | 179/2 A |

*Primary Examiner*—Douglas W. Olms

[57] ABSTRACT

Chiefly by means restricting/specifying the telephone numbers possible to dial from a door-attached and else to its purpose adapted telephone, a normal public automatic subscriber telephone network in its entire ordinary functioning and capacity of communication is being used in the specific order to establish a well defined door to tenant communication situation in a house of such a door telephone, enabling a visitor to call up a tenant and seek admission through the locked door, time-limitable conversation between them, and tenant to open the door free of choice. The functioning is specific for each house, yet no extra installations or arrangements in the common telephone network or in the house are needed, but the door telephone beeing conventionally connected with the existing telephone network can without measures share its regular and new, anyway for general purposes introduced extra services to distinguish the function. Thus extra features like particular ringing and overcoming of busy line are thereby provisionable, protection against misuse is obtained, and can the door in a house that so wishes be opened from an outside distance when so called for by post men, emergency personell and the like.

13 Claims, 1 Drawing Figure

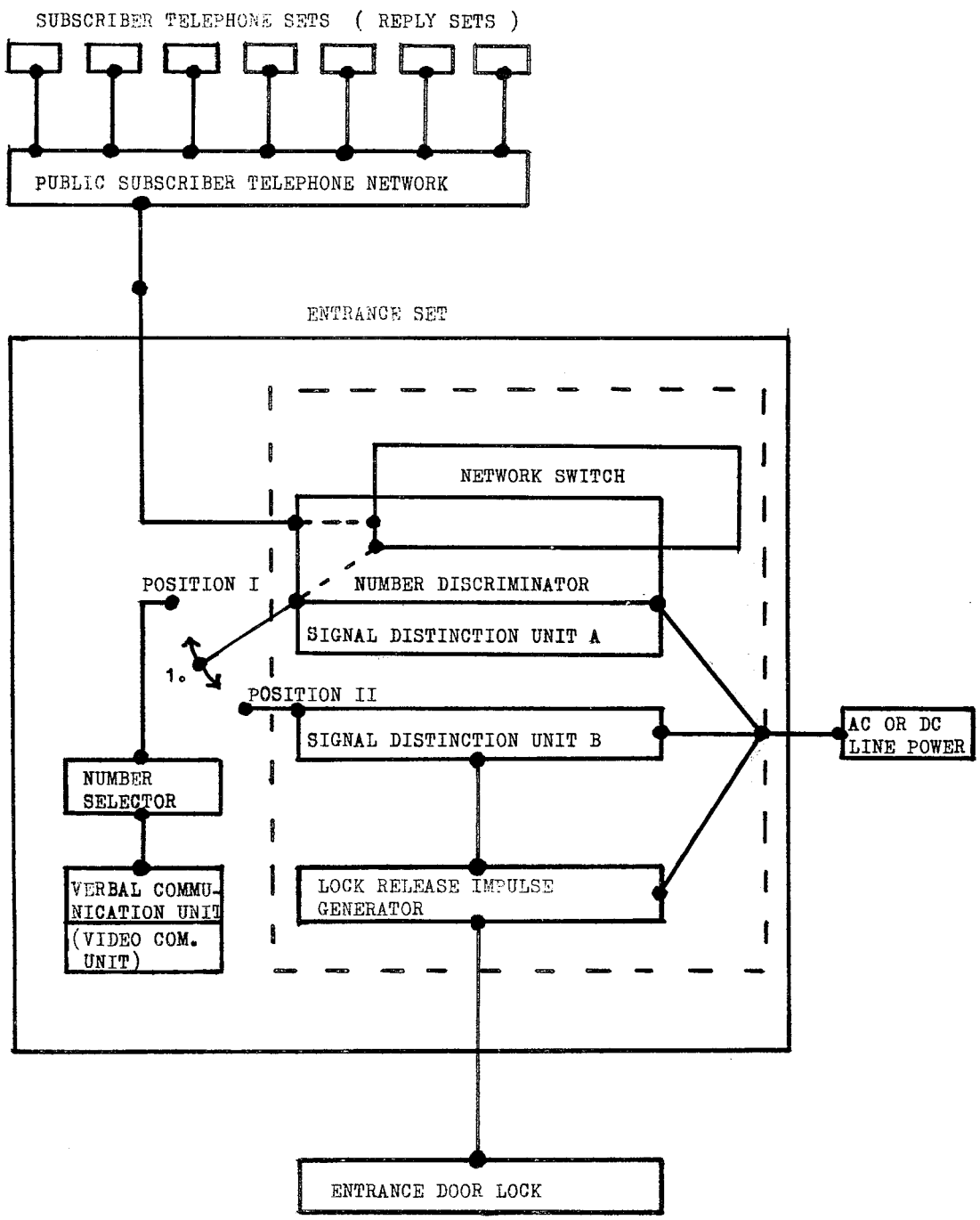

USE OF PUBLIC SUBSCRIBER TELEPHONE NETWORK; METHOD AND APPARATUS

This invention relates to a specific use of a public automatic subscriber telephone network as a whole, and more particularly to the use beeing specific door signalling and opening control purposes of a distinct entrance.

The number of locked entrances is steadily increasing, causing great disadvantages for tenants as well as visitors. Devices such as local intercom systems are previously known, arranged to allow passage. However, these systems have a number of disadvantages, which, despite the fact that the entrance door can be kept locked, often prevent installation. These systems reguire separate wiring between the main unit and each connected tenant unit, each tenant unit must be arranged with a separate signalling source, verbal communication unit and impulse source for unlocking the entrance door. This makes the installation cost high and also increases the risk for malfunction. Irritation is often caused by unauthorized use or mistake in the use of call button panels, often difficult to visualize and read, which cause irritation by an immediate signal in the associated receiver unit when a call button is depressed. Postmen etc. will perhaps not allways manage to get in touch with a tenant for opening, or must cause inconvenience when seeking to, and if any flaw should occur, repair may be difficult to get since no uniform service exists.

A few systems to this end have been accounted for, as parts employing the tenants subscriber telephone sets and some stretch of their lines, but these systems can not operate in such a mode, that the advantages of the whole automatic public subscriber telephone network with the capacity of communication are used, thus maintaining a number of the previously mentioned features and disadvantages. In not having any outgoing line to the automatic exchanges of the public subscriber telephone network, they cannot reach and benefit from said networks own switching exchange capacity, even if they were equipped with any common device for or associated with dialing telephone numbers. One of these previously known systems requires a separate intercom switching unit, connecting up to the various subscriber telephone lines within the actual building, and separate intercom wiring to points of such juncture for the communication between entrance and tenants, which affects the cost of installation. Another type of a previously known system requires for the communication between entrance and tenants separate switch and control units preferably in the central office for each connected building, separate from the public network exchange equipment, said separate equipment having fixed connection to each of the ingoing terminals to every subscriber in the building concerned. If a large number of such systems are to be connected in the C. O. building, a rather complex switching technique must be adapted, thus increasing the cost if installation. Both systems, remaining basicly intercom, can also be used for unauthorized calls or calls by mistake which might be of less importance in buildings with a lobby, but could be of considerable importance in apartment houses having an entrance facing the street. In most houses or buildings, the cost of installation is also of utmost importance.

It is a known fact of to-day, that the general public in the homes have access to a well-functioning, selective system of communication, including wiring, automatic exchange devices, signalling means, verbal communication units and also a good service, i.e. a public subscriber telephone network with a connected subscriber telephone set, which can be installed at a modest cost for those not presently using this service.

It is the object of my invention to use all these, and for the purpose unaltered, functions for specific signalling and opening purposes of an entrance by means of the public telephone network, achieved by the introduction of a specifically functioning and to the telephone network connected apparatus, adjacent to the entrance.

It is features of my invention that only one simple installation is necessary, regardless of the location and the number of apartments behind the entrance, in which the tenants ordinary telephone sets can be used. Only one extension connected to a common and easily accessable circuit network is necessary, and all more specific functions are includable in said extension set, serving at the entrance, said set preferably beeing of a uniform design, thus reducing the costs involved to a minimum.

Other features of the present invention, including the basic principles for the function, will be gained from the following description of a possible embodiment of the invention as schematically illustrated in the accompanying drawing, which is a block diagram representation of one illustrative embodiment of my invention, where it is thought, that video telephone network has been established and video communication means is provided, showing in general the relationship between the parts. Due consideration should be given to the fact, that within the disclosed principle to use a subscriber telephone network for door signalling and opening purposes, by means of suitably connected and designed devices, many other technical arrangements also are possible within the scope of the invention, since even if the technical arrangement is varied, the realizing and introduction of the functioning and to the telephone network conventionally connected apparatus at the entrance is the basic feature making it possible to utilize the telephone network as herein disclosed. As a consequence, the technical solutions of the functions described will only be indicated. In this country existing conditions for the subscriber telephone networks (Telephone companies, existing devices and technique, level of automation, terms etc.) should be considered as existing.

Referring now to the following, a uniform set, "the Entrance Set" as called in the drawing, including conventional dialing means, "the Number Selector", and — loudspeaker or handset — verbal communication unit, and possibly a camera unit if video telephone network has been established, is installed at the entrance or in the lobby accessable for visitors, and connected by the telephone authorities to the public telephone network as an ordinary subscriber telephone set. This set does not need a subscriber telephone number, but it is possible to dial numbers from same. Normally, this set is separated from the telephone network by means of a line power switch, "the Network Switch", and connected by a visitor when wishing to make a call. By means of the number selector device, the visitor is now able to establish conventional telephone contact via the automatic subscriber telephone network with any tenants ordinary subscriber telephone set, "the Reply Set". The switch indicated as 1 in the enclosed drawing is during this operation in position I.

A visitor would be able to dial any telephone number. However, for door signalling purposes only certain telephone numbers can be held relevant, i.e. numbers inside the entrance. A device, "the Number Discriminator", is included, restricting the use of the entrance set to relevant telephone numbers only. It can be programmed for any numbers and is instructed to pass on only programmed numbers. This device is preferably programmed by the telephone company engineers for the numbers relevant to each entrance, which means that out of millions of combinations, the number dialed at the entrance set must strictly conform with one of the programmed numbers, if a call should be connected to the telephone network. This system protects the telephone company from the set being used for ordinary telephone calls. It also includes protection for the tenants from unauthorized calls. If no panel displaying the names and/or telephone numbers is arranged by the entrance set, the visitor must known who lives behind the entrance and/or the telephone number, before a signal to a tenant can be accomplished. This clearly favours welcome, or at least selected number is very low, but in really having an errand to known tenants, telephone numbers can easily be gained by common telephone directories if not known or forgotten. However, tenants having secret telephone numbers can maintain this prtection, and tenants with no desire to communicate with visitors, can still have a telephone set, if their telephone numbers are not programmed/or removed in the number discriminator.

From what has been stated above and particularly in view of what will be disclosed below, it will become obvious for anybody skilled in the art, that primarly, it is the number restriction facilities which make it possible to utilize the entrance telephone set for its specific purpose and building, despite the fact that it is connected in a conventional way to the whole public subscriber telephone network. It is also then obvious for any person skilled in the art, that the number restricting device, once being discerned, can be designed according to numerous technical solutions. The number discriminator can be connected in parallel with the number selector as a "passive" component, i.e. letting the dialed number pass to the exchange, simultaneously checking each digit and disconnecting the call after any wrong digit or whole number, in which case the switching capacity of the telephone network might be loaded with many unauthorized number selecting operations. It can also be connected in series as an "active" component, i.e. first checking/approving the selected number, thereafter seizing the line to the central offibe and repeating or self dialing the approved telephone number to the automatic exchange. In this case, the switching capacity of the telephone network is only loaded with authorized switching operations, which is preferred, particularly in view of the advanced LSI-technique now available, making small units able to convert key set dialed numbers to a conventionally dialed number if required, and which circuits have a programmable memory capacity for storage of approved telephone numbers, which, after dialing from a key set, which is preferred, are repeated or dialed to the switching exchange of the public subscriber telephone network, in the way prescribed by said telephone network. Such a circuit can also be adressed from a conventional name/signalling panel and dial a programmed number depending on the pushbutton depressed, thus equivalent to a common automatic dialer, but such a system can be used by unauthorized persons and mistakes caused by depression of the wrong key can also occur. Preferably, the ordinary subscriber telephone numbers are used for signalling purposes from the entrance, since they are best known to all wellcome visitors. For certain tenants, e.g. doctors, firms offices, can at the same time means for short number selection from the key set be arranged for adressing the number discriminator. The method for number selection can thus be arranged to suit every type of building in the most convenient way. It is now also obvious for any person skilled in the trade, that the number discriminator also can be arranged outside the actual entrance set, without leaving free access to the full switching capabillity of the telephone network.

Any wrongly dialed number is prevented to pass on, or the network switch is caused by the number discriminator to immediately disconnect the entrance set from the telephone network, which connection can be reestablished by a visitor for a new number selecting operation. If however the selected number conforms with a number programmed in the number discriminator, an ordinary call to that number is connected up by the automatic exchange of the telephone network, and so a telephone signal is caused in one of the reply sets. When a person answers this call, verbal communication is established, i.e. request for entrance, identification etc., but a two-way electrical contact suitable for other signalling purposes is also now established between the entrance and the reply set. There is no other method to establish contact between subscriber telephone sets and an entrance set than by a call from the last mentioned set, since the entrance telephone set is not allocated a subscriber telephone number and normally disconnected from the telephone network. It is therefore a certain fact, that only telephone sets with their telephone numbers programmed in the number discriminator of the entrance set, of all subscriber telephone sets in the public network, can indue any type of signal to the entrance set concerned, and only so after having been therefrom called up and answered that call. If said entrance set is arranged to be influenced by a signal, which can be created by any subscriber telephone set in the telephone network, said influence can only be created from a restricted number of authorized subscriber telephone sets. The entrance set is designed to receive a signal for entrance unlocking purposes, created by means of a normal subscriber telephone set, now acting as a reply set, said signal being conventional and uniform for all entrance sets/reply sets.

A suitable signal from a reply set according to the described embodiment of this invention, could be the movement of the number selecting device to digit 9, thereafter releasing same within a short period of time without replacing the handset. Thereby, a disconnection is first caused, followed by a repeated number of pulses and a reconnection. This can be audiably illustrated by means of an ordinary hand set, provided that a party at the other end of the line carries out the suggested operation.

A device, referred to as a "Signal Distinction Unit A + B", included in the entrance set, analyses after establishment of contact with a reply set the above signal sequence, the unit A sensing the interruption forming the first part of the sequence, causing unit A to move switch 1 shown in the drawing to position II. The remaining part of the signal sequence, being the pulses and the reconnection, can now be sensed by unit B. Reception here of the correct pulse sequence within a reasonable restricted period of time, followed by reconnection, causes the "Lock Release Impulse Generator", which could be a relay, to generate an opening impulse, which can be an electrical impulse, to the (electrical) entrance door lock connected to the lock impulse generator, said door lock being of any known type. When the release of the entrance door lock has been accomplished, the entrance set returns to the initially described state of inactiveness.

The division of the signal distinction unit into two parts A + B, and the switch 1 shown in the drawing, are arranged to give protection against not desired releases of the entrance door lock. Since the switch 1 must take up position II to enable unit B to receive signals, unit B can not be manipulated in order to open the entrance from the verbal communication unit or the number selecting unit of the entrance set. Since unit B must receive the correct pulse sequence within a restricted period of time, a disconnection of the call, e.g. caused by the called party hanging up, does not initiate the opening of the entrance. The called party can thereby refuse to open the entrance door. If unit B does not receive the correct pulse sequence within a short period of time, but an other or no sequence at all, said unit can be designed to cause the network switch to disconnect the connection of the entrance set from the telephone network, instead of initiate a lock release. The switch 1 is now returned to position I, possibly after a predetermined time delay, thus making it possible for the called party to reach the line without being prevented by immediate repeated malicious attempts to establish contact from the entrance set from any person.

Since the entrance set is by ordinary means connected to the public telephone network, all the extra services offered by this network to the subscribers can be shared. Two of these services, presently used in certain areas, are "call waiting" and "code ringing". The first mentioned service is a particular signal in the handset for a party on the line, if a third party is calling the engaged number, whereby the party on the line can take said call. The second service mentioned involves different signal characters for calls from different types of subscribers. These services, to be introduced in many areas, can also advantageously be used for entrance sets.

All functions described above can also be regarded as separate functions, interworking by means of electromechanical means, as well as arranged outside the entrance set, but preferably arranged as one electronical unit, as indicated in the drawing, thus permitting mass production at a low cost and simple installations, since the units can be identical for all entrance sets, given a separate identity by the programming of the number discriminator included in the device. This unit can also be powered separately from a line source, as indicated in the drawing, and connected in such a way, that it is not used when the entrance door is kept unlocked. No dialed numbers or calls will then be connected to the telephone network.

Certain conditions of restriction can also be included in this unit, e.g. if the call time should exceed say one minute, if no reply has been received after 6 signals, or 15 seconds after the last digit is an uncompleted number sequence or no number dialed after connection, said conditions in order to avoid malicious use or mistakes.

According to a foreseen separate embodiment for special purposes or houses, a number of entrances are simultaneously but selectively controlled from one entrance set, the number discriminator selectively guiding the by a reply set generated release impulse for one or more locks on basis of the information obtained from the dialed telephone number.

According to another foreseen separate embodiment for special buildings, the key set of the entrance set can at the same time adress a common combination lock device, the number dialed being a programmed telephone number, being dialed to the telephone network, but being the number programmed for in the combination lock, opening the door at once. The same confidentiality problems regarding the code for lock release as in all combination lock devices will however be present, whereas in a telephone conversation there always will be present the not codified checking capability of the called party.

If desired, each entrance set can also be programmed to pass on a common number for all entrance sets in the area/city/etc., to be used by post men, emergency personell, guards etc., when the opening of a locked entrance is by them desired, the entrance door lock being released after due control of the calling party from the called party. This number can be allocated a distinct subscriber telephone set anywhere in the area/city/etc., thus functioning as an opening central. It is easily understood, that despite the fact that said number can be dialed from any entrance set, release of the entrance door lock will only be affected for the entrance from which the call is actually made.

According to a concluding foreseen separate embodiment of my invention, on occasions when it is conveniant and desired to give the general public access to common telephone communication from the entrance set, e.g. by adapting it as an automatic coin-in-the-slot telephone, and yet maintain its specific signal and opening purposes for the entrance door where it is located, the number discriminator will permit any number to be connected up, but it will activate the signal distinction unit and lock release impulse generator only when numbers programmed for are being dialed, this for instance achieved by letting the switch 1 shown in the drawing take position II only if the dialed number has corresponded with the programmed. Since the calling party then pays for the call, all numbers can be permitted for general conversation, but since only programmed numbers, thus will make lock release possible, only authorized subscriber sets can, as above, dial the 9 causing the lock release, and thus the entrance set is still specified for its house and purpose. If subscriber sets having a number not programmed for in the number discriminator are to be reached from the entrance set, their "unprogrammed" numbers must first be dialed, and are also in this embodiment allowed to be so resulting in a call to such a set, but if the 9 now is being therefrom dialed in return, the number discriminator by not having recognised these numbers as authorized (programmed) ones, opens up no connection way for that signal to reach signal distinction unit B, and thus no door opening control is possible for unauthorized though else contactable subscriber telephone sets. If, hypothetically, the entrance set is allocated a telephone number and has answered a call from any subscriber telephone set, the door lock cannot either be released. The number discriminator has still not sensed any programmed telephone number having been dialed on the entrance set and consequently blocks any signals from reaching signal distinction unit B. However, this embodiment is not likely to be often applicable. Since the herein first described and preferred embodiment only loads the switching capacity of the telephone network with authorized calls, the telephone company might well permit gratis calls from the entrance set, being able to charge a small extra subscription fee for those wishing to have their number programmed for in the number discriminator to cover the costs.

As has been described, it is basicly the normal functioning of an existing telephone network that has been brought to this specific use, by means of the entrance set. In doing so, the entrance set must strictly conform to the technical specifications for each telephone network. Moreover, different types of buildings might prefer slightly different technical solutions of the described functions, as can existing technology easily provide many. It is to be understood that the above-described arrangements are illustrative of the application of the principles of the invention. Numerous other arrangements may be deviced by those skilled in the art without departing from the sprit and scope of the invention.

Having thus described my invention, what I claim is:

1. The method of utilizing a public subscriber telephone network for door signalling and opening purposes by means of a telephone set connected to said telephone network, said set being arranged outside the entrance door of an apartment house or any other entrance door and intended for the purpose of communication between a visitor and a tenant inside said entrance door, when locked, said visitor thus being able to make a call from said telephone set, hereinafter called the "entrance set", to the subscriber telephone set, hereinafter called the "reply set", of any desired tenant, caretaker or other party authorized to release the entrance door lock of said entrance door, the communication thus established via said telephone network between the entrance set and the reply set enabling, apart from conversation, the called party to initiate the release of said entrance door lock, said method comprising the steps of, employing the common public subscriber telephone network, including common automatic exchanges, common telephone numbers and common subscriber telephone sets for all communication between the entrance set and the reply set, providing the entrance set with switching means by which it can be coupled onto a telephone line going out to the automatic exchanges of said telephone network, means for number selecting and means for verbal communication, providing the entrance set with means connected to said entrance door lock responsive to signals received via said telephone network and induced from a reply set after establishment of telephone contact between the entrance set and any reply set for thereupon releasing said door lock, and providing the entrance set, when intended only for contact via the telephone network with an authorized party for release of the entrance door lock, with number discriminating means, programmable for desired telephone numbers or their equivalents, for securing that only said programmed numbers will be connected through said telephone network in a way that enables reply sets to actuate the release of said entrance door lock.

2. The method of claim 1 comprising the further steps of employing common video transmission units for existing video public subscriber telephone network, and providing the entrance set with means for video communication.

3. The method according to claim 1, wherein said number discriminating means comprises a common device as known to the trade under the term "automatic dialer" being addressable from said means for number selecting to dial any of its programmed telephone numbers.

4. In combination with a public automatic subscriber telephone network an apparatus having connecting means by which the apparatus can be connected to a door lock, comprising:

switching means by which said apparatus can be coupled onto a telephone line going out to the automatic exchanges of said telephone network;

selecting means for dialing telephone numbers to said telephone network;

discriminating means for securing that only certain telephone numbers out of all those of the whole said telephone network can be selected resulting in said telephone networks performing a call to one of said telephone networks subscriber telephone sets;

means for verbal communication with said subscriber telephone; and means responsive to signals induced from said subscriber telephone for thereupon releasing said door lock.

5. The combination of claim 4, wherein said selecting means comprises signal generating means for producing signal characters not initially forming telephone numbers but subsequently to be transformed to telephone numbers.

6. The combination of claim 4, wherein said selecting means is key set operated.

7. The combination of claim 4, wherein said selecting means comprises common pushbuttons, each associated with a means for dialing a predetermined telephone number.

8. The combination of claim 4, further comprising means for short number selection of certain predetermined telephone numbers.

9. The combination of claim 4, wherein said selecting means also addresses a common combination lock device.

10. The combination of claim 4, including a means for video communication via said telephone network with said subscriber telephone.

11. The combination of claim 4, wherein said discriminating means comprises a common device as known to the trade under the term "automatic dialer" being addressable from said selecting means to dial any of its programmed telephone numbers.

12. The use of a public subscriber telephone network by means of a telephone set connected to said telephone network, said set being arranged outside the entrance door of an apartment house or any other entrance door, for the purpose of communication between a visitor and tenant inside said entrance door, when locked, said visitor thus being enabled to make a call from said telephone set, hereinafter called the "entrance set", to the subscriber telephone set, hereinafter called the "reply set", of any desired tenant, caretaker or other party authorized to release the entrance door lock of said entrance door, the communication thus established via said telephone network between the entrance set and the reply set enabling, apart from conversation, the called party to initiate the release of said entrance door lock, said use comprising the steps of, utilizing existing public subscriber telephone network, including existing automatic exchanges, existing telephone numbers and telephone sets allready possessed by telephone subscribers acting as called party for the communication between the entrance set and the reply set, providing the entrance set with switching means by which it can be coupled onto a telephone line going out to the automatic exchanges of said telephone network, means for number selecting and means for verbal communication, providing the entrance set with means connectable to said entrance door lock responsive to signals received over said telephone network and induced from a reply set after establishment of telephone contact between the entrance set and any reply set for thereupon releasing said door lock, and providing the entrance set with number discriminating means, programmable for desired telephone numbers or their equivalents, for securing that only said programmed numbers will be connected through said telephone network enabling reply sets to release said entrance door lock.

13. The use of claim 12 comprising the further steps of utilizing video transmission units for existing video public subscriber telephone network, and providing the entrance set with means for video communication.

* * * * *

UNITED STATES PATENT OFFICE
CERTIFICATE OF CORRECTION

Patent No. 3,947,641  Dated March 30, 1976

Inventor(s) Anders Edvard Trell

It is certified that error appears in the above-identified patent and that said Letters Patent are hereby corrected as shown below:

Column 3, line 25, " or at least selected number is very" should read -- or at least legitimate visitors. The probability for a signal with a randomly selected number is very --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*